(12) United States Patent
Choi et al.

(10) Patent No.: US 11,267,459 B2
(45) Date of Patent: Mar. 8, 2022

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventors: Jin Hyuk Choi, Miryang-si (KR); Sung Won Yoon, Yongin-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 166 days.

(21) Appl. No.: 16/703,536

(22) Filed: Dec. 4, 2019

(65) Prior Publication Data
US 2020/0180607 A1 Jun. 11, 2020

(30) Foreign Application Priority Data
Dec. 6, 2018 (KR) .................. 10-2018-0156240

(51) Int. Cl.
*B60W 30/06* (2006.01)
*G05D 1/00* (2006.01)
*G05D 1/02* (2020.01)

(52) U.S. Cl.
CPC .......... *B60W 30/06* (2013.01); *G05D 1/0088* (2013.01); *G05D 1/0214* (2013.01); *G05D 1/0276* (2013.01); *G05D 2201/0213* (2013.01)

(58) Field of Classification Search
CPC .... B60W 30/06; B60W 30/181; B60W 10/18; B60W 30/09; B60W 40/02; B60W 2556/45; B60W 2520/04; B60W 2554/00; G05D 1/0088; G05D 1/0214; G05D 1/0276; G05D 2201/0213; G05D 1/0238; G05D 1/0212; G08G 1/146; G08G 1/143; G08G 1/202; G08G 1/164; G08G 1/166;
(Continued)

(56) References Cited

U.S. PATENT DOCUMENTS

2010/0318256 A1* 12/2010 Breuer .................. B60T 8/3275
701/31.4
2017/0021828 A1 1/2017 Seo et al.
(Continued)

FOREIGN PATENT DOCUMENTS

DE 10 2016 102 065 A1 8/2017

OTHER PUBLICATIONS

European Search Report dated Apr. 29, 2020 from the corresponding European Application No. 19213802.2, 14 pp.

*Primary Examiner* — Rodney A Butler
(74) *Attorney, Agent, or Firm* — Lempia Summerfield Katz LLC

(57) ABSTRACT

An automated parking system of a vehicle autonomously moves to and parks in a vacant parking slot based on communication with an infrastructure facility for automated parking. In particular, the infrastructure facility transmits an autonomous valet parking start command to the vehicle and then transmits a target position and a guide route to the vehicle. The vehicle performs autonomous valet parking based on the target position and the guide route received from the infrastructure facility, and may apply an emergency brake when an area around the vehicle is determined as being unsafe during autonomous driving to the target position.

17 Claims, 12 Drawing Sheets

(58) Field of Classification Search
CPC .. G08G 1/096816; G08G 1/148; G08G 1/168; B62D 15/0285; B60Y 2300/06; B60Y 2300/18091
See application file for complete search history.

(56) References Cited

U.S. PATENT DOCUMENTS

| | | | |
|---|---|---|---|
| 2017/0253237 A1* | 9/2017 | Diessner | B60W 30/06 |
| 2017/0313306 A1 | 11/2017 | Nordbruch | |
| 2017/0329346 A1* | 11/2017 | Latotzki | G05D 1/0088 |
| 2018/0089631 A1* | 3/2018 | Baker, Sr. | G06Q 10/1093 |
| 2018/0286249 A1 | 10/2018 | Nordbruch | |
| 2018/0304887 A1 | 10/2018 | Nordbruch | |
| 2018/0341257 A1 | 11/2018 | Nordbruch et al. | |
| 2019/0061462 A1* | 2/2019 | Smith | B60H 1/00392 |

\* cited by examiner

FIG. 4A

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver those information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum inner radius of the vent designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD), and monitor safety driving and parking operation of each vehicle (supervise) | • Estimate its own position<br>• Inform the infra of its estimated position / with the accuracy and frequency operated below (TBD)<br>• Inform the infra of its own status<br>• Detect the following obstacles (TBD) |
| <5> AUTONOMOUS PARKING | | • Park and stop the vehicle at the target position designated by infra (equivalent to PAPS parking requirements) |

FIG. 4B

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop if safety is not confirmed | • Start/emergency stop/re-start automated driving according to the instruction of infra<br>• Perform an emergency stop in case where a potential hazard is determined as a result of the detection mentioned above<br>• immediately decelerate at the rate of (TBD) m/s² and stop when the following conditions are met<br>(1) vehicle received an instruction from infra for E/S<br>(2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits Vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g. part failure, human or animal remaining inside the vehicle, etc)<br>• Perform emergency stop when above fault is detected<br>• After coming to a stop, the vehicle shall remain stopped until it receives an instruction from infra to resume automated driving |

FIG. 5

| DATA | Contents | Transmit (T)/ Receive (R) | | Regularity(F)/ EventID Transmission | Note |
|---|---|---|---|---|---|
| | | Infrastructure | Vehicle | | |
| (1) Vehicle qualification information | ID number (VIN) to identify each vehicle | R | T | — | |
| (2) Automated driving pr operation instruction | | T | R | When entering the parking | |
| (3) Vehicle information n otification | Vehicle state (normal stop/ driving/emergency stop et c.)/Vehicle position(group) | R | T | Right before automated dr iving start | This is also used for comm unication fault check by th e vehicle |
| (4) Vehicle information re sponse | | T | R | F (1 Hz) | |
| (5) Target position · guid e route Delivery | Target position · st art location/Permitted/Non-abl e to pass through the gain (Maximum speed) | T | R | F (1 Hz) | |
| (6) Driving boundaries de livery | A group of lines to surrou nd the permitted driving ar ea | T | R | After automated driving in struction | |
| (7) Automated driving sta rt instruction | | T | R | after delivery of guide rout e and driving boundaries | |
| (8) Emergency stop instru ction | | T | R | After delivery of guide rout e and driving boundaries, when restarting after emer gency stop | |
| (9) Vehicle control releas e instruction | | T | R | — | |

SYSTEM, METHOD, INFRASTRUCTURE, AND VEHICLE FOR AUTOMATED VALET PARKING

CROSS REFERENCE TO RELATED APPLICATION

This application claims priority to and the benefit of Korean Patent Application No. 10-2018-0156240, filed on Dec. 6, 2018, the entire contents of which are incorporated herein by reference.

FIELD

The present disclosure relates to a system, method, infrastructure, and vehicle for performing automated valet parking. More particularly, the present disclosure relates to an automated parking system and method in which a vehicle autonomously moves to and parks in a vacant parking slot based on communication with an infrastructure facility.

BACKGROUND

The statements in this section merely provide background information related to the present disclosure and may not constitute prior art.

Many modern cities suffer from various problems associated with vehicle parking. For example, there is a risk of a car collision in a parking lot. For parking in crowded places such as large shopping centers, it takes long time and much energy to park a car due to traffic congestion before entering a parking lot. In addition, it takes long time and much energy to locate a vacant parking slot even after entering a parking lot. In addition, there is inconvenience that a driver must walk to a spot at which his or her vehicle is parked when leaving the visited area or that sometimes the driver forgets where the vehicle is parked.

SUMMARY

The present disclosure provides an automated valet parking method in which a vehicle autonomously moves to and parks in a vacant parking slot after the vehicle stops in a drop-off area at which the driver exits the vehicle.

In another form, the present disclosure provides an automated valet parking method in which when a driver claims his or her vehicle to leave a visited area, the vehicle that is parked in a parking slot autonomously moves from the parking slot to a pickup area at which the driver conveniently gets in the vehicle to leave a parking lot.

According to one aspect of the present disclosure, an automated valet parking method includes: initiating an automated valet parking procedure of a vehicle; receiving, by the vehicle, a target position and a guide route from an infrastructure facility for parking the vehicle; performing, by the vehicle, autonomous driving according to the guide route; applying, by the vehicle, an emergency brake during the autonomous driving; and parking, by the vehicle, in the target position and ending the automated valet parking procedure.

The applying of the emergency brake may include: determining, by the infrastructure facility, that an area around the vehicle is unsafe, and transmitting an emergency brake command to the vehicle in a case where the area around the vehicle is unsafe.

When the infrastructure facility detects a risk that the vehicle collides with a certain vehicle or an abruptly appearing obstacle (hereinafter, referred to as a sudden obstacle), the infrastructure facility determines that the area around the vehicle is unsafe.

The term "certain vehicle" may mean a vehicle that is in the process of performing autonomous valet parking or a vehicle that is parked, and the term "obstacle" may mean a human, an animal, or any object that may be injured or damaged when hit by the vehicle.

The applying of the emergency brake may include: determining, by the vehicle, that an area around the vehicle is unsafe, and applying an emergency brake before receiving an emergency brake command from the infrastructure facility. The vehicle determines that the area of the vehicle is unsafe when there is a risk that the vehicle collides with a certain vehicle or a sudden obstacle.

The term "certain vehicle" may mean a vehicle that is in the middle of performing autonomous valet parking or a vehicle that is parked, and the term "obstacle" may mean a human, an animal, or any object that may be injured or damaged when hit by the vehicle.

The method may further include notifying the infrastructure facility that the vehicle is in an emergency stop state after applying the emergency brake.

The method may further include notifying the infrastructure facility of the type or position of an obstacle that is the cause of the emergency stop state.

The receiving of the target position and the guide route may include a step of receiving a temporary parking zone as the target position when there is no vacant parking slot in a normal parking zone of a parking lot.

When a problem occurs in the vehicle during the autonomous driving, the vehicle may receive a temporary parking zone as the target position.

When a problem occurs on the guide route during the autonomous driving, the vehicle may receive a temporary parking zone as the target position.

When a problem occurs in the target position during the autonomous driving, the vehicle may receive a temporary parking zone as the target position.

When there is no vacant parking slot at the time of initiating the autonomous valet parking procedure, the vehicle may perform a searching drive operation in which the vehicle autonomously drives along a closed loop driving lane in the parking lot.

The infrastructure facility may transmit the closed loop driving lane to the vehicle as the guide route.

When an arbitrary vehicle leaves the parking lot so that a vacant parking slot is made available, the infrastructure facility may transmit the vacant parking slot as the target position to the vehicle and may transmit a drive path from a current vehicle position to the vacant parking slot as the guide route.

When an arbitrary vehicle leaves the parking lot so that a vacant parking slot is made available, the vehicle that is in the middle of the searching drive operation detects the occurrence of the vacant parking slot using a built-in sensor, notifies the infrastructure facility of the presence of the vacant parking slot, and autonomously moves to and parks in the vacant parking slot.

According to another aspect of the present disclosure, an automated valet parking system includes: an infrastructure facility that transmits an autonomous valet parking start command to a vehicle and then transmits a target position and a guide route to the vehicle; and the vehicle that performs autonomous valet parking based on the target position and the guide route, in which the vehicle applies an emergency brake when it is determined that an area around the vehicle is unsafe during autonomous driving to the target position.

The infrastructure facility may transmit an emergency brake command to the vehicle when the infrastructure facility determines that an area around the vehicle is unsafe.

The case where the area around the vehicle is unsafe may be a case where there is a risk that the vehicle collides with a certain vehicle or a sudden obstacle, and the term "certain vehicle" may mean a vehicle that is in the middle of performing autonomous valet parking or a vehicle that is parked, and the term "obstacle" may mean a human, an animal, or any object that may be injured or damaged when hit by the vehicle.

When the vehicle self-determines that the area around the vehicle is unsafe, the vehicle may apply an emergency brake before receiving an emergency brake command from the infrastructure facility.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are diagrams illustrating operations for automated valet parking performed by an infrastructure facility and a vehicle;

FIG. 5 is a diagram illustrating a communication process performed by a vehicle and an infrastructure facility for automated valet parking;

Figure 1:
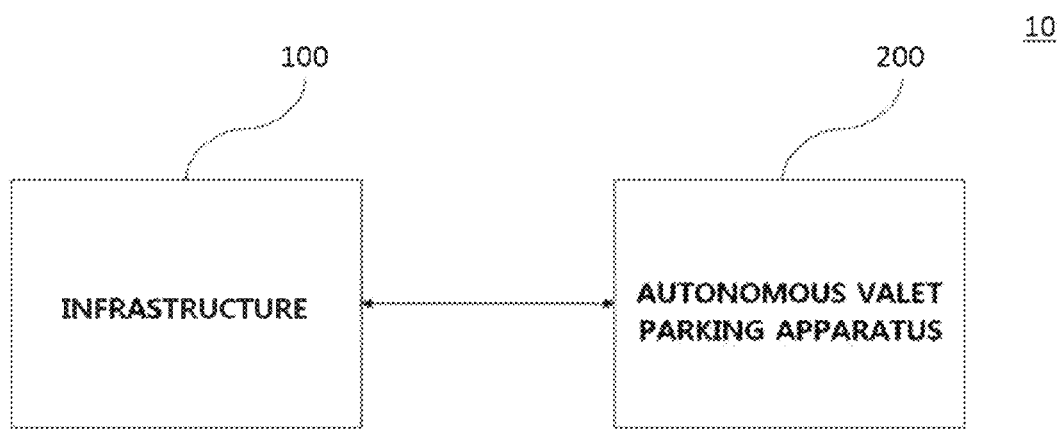
FIG. 1 is a view illustrating an automated valet parking system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Herein below, exemplary forms of the present disclosure will be described in detail with reference to the accompanying drawings. The construction and operational effect of the present disclosure will be clearly understood from the following detailed description. Prior to describing the exemplary forms in detail, it is noted that throughout the drawing the same components will be denoted by the same reference numerals as possible and a detailed description about existing components and functions is omitted when the subject matter of the present disclosure may be obscured by the description.

It is also noted that terms used in the detailed description of the present disclosure are defined below.

The term "driver" refers to a person who uses a vehicle that is to be valet-parked by an automated valet parking system.

The term "driving authority" refers to the authority to drive and control a vehicle. The term "vehicle operation" refers to an operation such as steering, acceleration, braking, gear shifting, ignition turning on and off, and door locking and unlocking of a vehicle.

The term "vehicle" refers to a vehicle having an autonomous valet parking feature.

The term "control center" refers to a facility that can monitor vehicles parked in a parking garage or facility, which determines a target position, a guide route, and a permitted driving area, and which transmits a driving start command or an emergency stop command to a vehicle.

The term "infrastructure facility" refers to a parking facility and includes sensors installed in the parking facility. Alternatively, the infrastructure facility refers to a control center that controls a parking lot gate, vehicles in a parking lot, etc.

The term "target position" refers to a vacant parking slot available for parking. Alternatively, the term "target position" refers to a pickup area where a driver gets in his or her vehicle in a situation when the driver wants to leave the parking lot.

The term "guide route" may refer to a route along which a vehicle travels to reach a target position. For example, at the time of parking a vehicle, the guide route is a route extending from a drop-off area to a vacant space. For example, the guide route is provided in the form of instructions, for example, "driving straight ahead 50 m and turning left at the corner".

The term "driving route" refers to a driving path along which a vehicle travel.

The term "permitted driving area" refers to an area where driving of a vehicle is allowed. For example, the permitted driving area includes the driving route. The permitted driving area is defined with barrier walls, parked vehicles, parking lines, etc.

FIG. 1 is a view illustrating an automated valet parking system according to one form of the present disclosure. Referring to FIG. 1, an automated valet parking system 10 includes an infrastructure facility 100 and an autonomous valet parking apparatus 200.

The infrastructure facility 100 refers to a facility or system for operating, managing, and controlling an automated valet parking system. For example, the infrastructure facility 100 may be a parking facility. According to one form, the infrastructure facility 100 includes sensors, communication devices, alarm devices, display devices, and a server device that controls those devices. Alternatively, the infrastructure facility refers to a control center that controls a parking lot gate, vehicles in a parking lot, etc.

The autonomous valet parking apparatus 200 means a vehicle that can perform autonomous valet parking. According to some forms, the autonomous valet parking apparatus 200 means a component or a set of components capable of performing autonomous valet parking.

Figure 2:
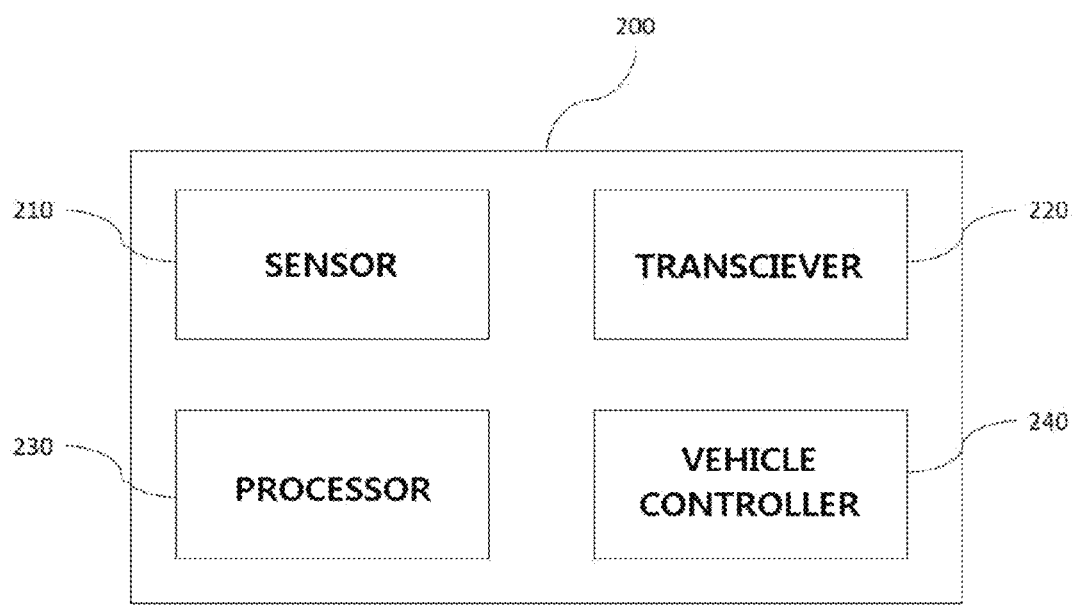
FIG. 2 is a view illustrating an autonomous valet parking apparatus.

FIG. 2 is a view illustrating an autonomous valet parking apparatus according to one form of the present disclosure. Referring to FIG. 2, the autonomous valet parking apparatus 200 (i.e., vehicle) includes a sensor 210, a transceiver 220, a processor 230, and a controller 240.

The sensor 210 senses parameters of a surrounding environment of the autonomous valet parking apparatus 200. According to exemplary forms, the sensor 210 measures the distance between the autonomous valet parking apparatus 200 and a specific object or detects objects that are present around the autonomous valet parking apparatus 200. For example, the sensor 210 includes at least one-type of sensor selected from among an ultrasonic sensor, a radar sensor, a lidar sensor, a camera, an infrared sensor, a thermal sensor, a millimeter wave sensor, and a GPS receiver.

The sensor 210 transmits data that is the detection results of the sensor 210 to the transceiver 220 or the vehicle controller 240.

The transceiver 220 communicates the data with the infrastructure facility 100. This communication is called vehicle-to-infra (V2I) communication. The transceiver 220 communicates the data with other vehicles. This communication is called vehicle-to-vehicle (V2V) communication. The V2I communication and the V2V communication are collectively called vehicle-to-everything (V2X) communication. According to one form, the transceiver 220 receives the data (for example, a target position, a guide route, a driving route, a command, etc.) from the infrastructure facility 100, processes the received data, and transmits the processed data to the processor 230. The transceiver 220 transmits data collected by the vehicle 200 to the infrastructure facility 100. According to other forms, the transceiver 220 communicates the data with the mobile terminal of the driver of the vehicle 200.

The transceiver 220 receives and transmits the data according to a wireless communication protocol or a cable communication protocol. Examples of the wireless communication protocol include, not limitedly, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in the present disclosure.

The processor 230 controls the overall operation of the vehicle 200. The processor 230 controls the vehicle controller 240 based on the data transmitted from the sensor 210 and from the transceiver 220. According to other forms, the processor 230 generates a control signal for controlling the vehicle controller 240 based on the data transmitted from the infrastructure 100 and then transmits the control signal to the vehicle controller 240.

That is, the processor 230 refers to a device that performs a series of calculations or makes a series of determinations to control the vehicle 200 and to perform autonomous valet parking. For example, the processor 230 is a processor that operates according to a computer program including instructions for performing autonomous valet parking.

The vehicle controller 240 controls the vehicle 200 according to the determination made by the processor 230. According to another form, the vehicle controller 240 controls the vehicle 200 according to the control signal transmitted from the processor 230. For example, the vehicle controller 240 controls various vehicle operations such as driving, stopping, resuming to drive, steering, accelerating, decelerating, lighting of lamps, alarm sounding, etc.

That is, the vehicle controller 240 functions to control all kinds of operations of the vehicle 200 described herein.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
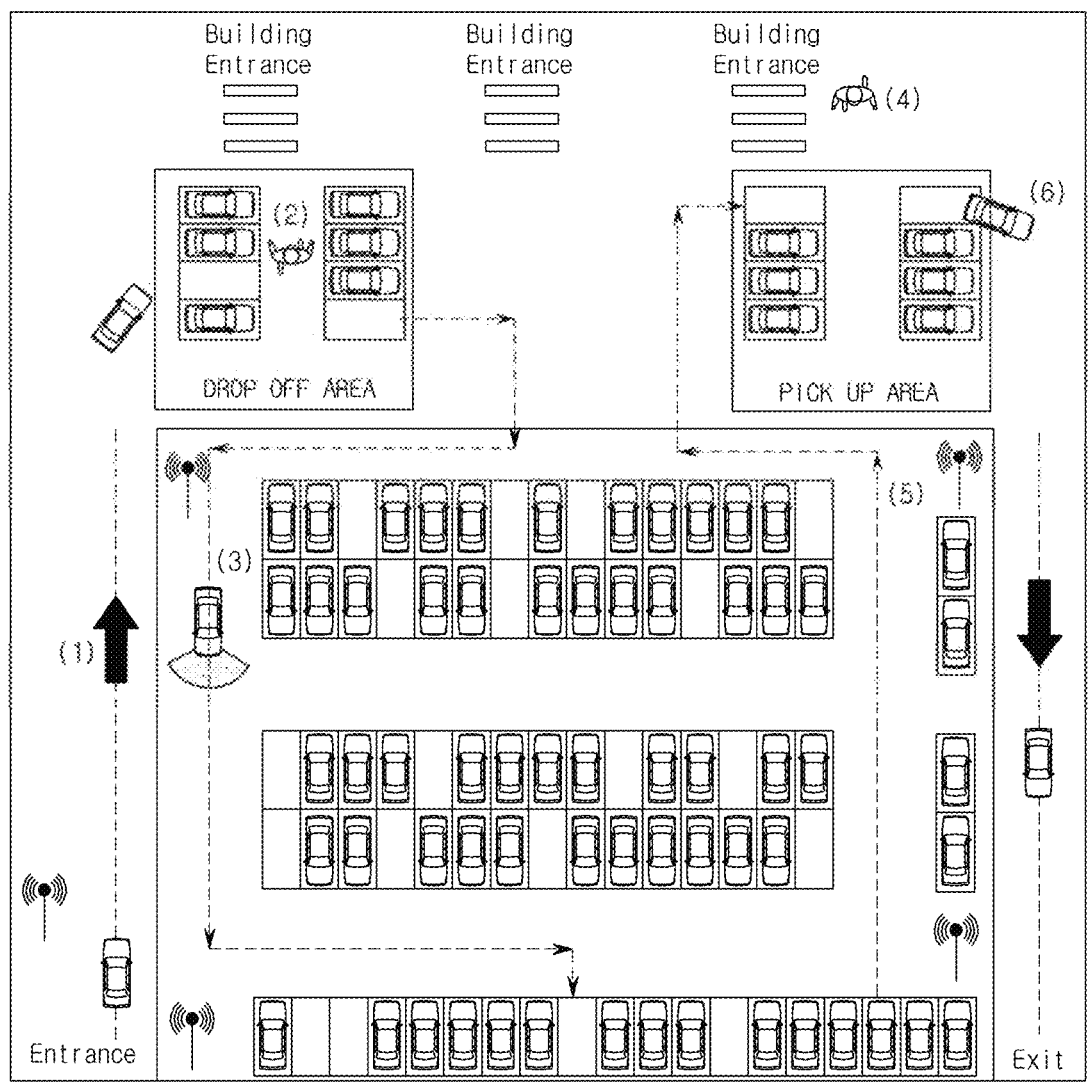
FIG. 3 is a conceptual view illustrating an automated valet parking system and method.

FIG. 3 is a conceptual view illustrating an automated valet parking system and an automated valet parking method according to one form of the present disclosure.

Referring to FIG. 3, in step (1), a driver drives a vehicle to a drop-off area at which the driver will exit the vehicle after passing through the entrance of a parking lot.

In step (2), the driver exits the vehicle at the drop-off area and the authority to drive or control the vehicle is delegated to the infrastructure facility.

In step (3), the infrastructure facility searches for a vacant parking slot and assigns a suitable vacant parking slot to the vehicle. The infrastructure facility determines a guide route leading to the assigned vacant parking slot. After the parking slot and the guide route are determined, the vehicle autonomously travels along the guide route to reach the parking slot and performs autonomous parking to the parking slot.

In step (4), the driver claims his or her vehicle parked in the parking lot and walks to a pickup area where the vehicle can be returned to the driver.

In step (5), the infrastructure facility determines a suitable target position. For example, the suitable target position may be a vacant parking slot of multiple parking slots within the pickup area. The infrastructure facility determines a guide route which can lead the claimed vehicle to the target position. After the target position and the guide route are determined and transmitted to the vehicle, the vehicle autonomously travels along the guide route to reach the target position and performs autonomous parking.

In step (6), the driver arrives at the pickup area and takes over the authority to drive the vehicle. The driver drives the vehicle toward the exit of the parking lot.

FIGS. 4A and 4B are diagrams illustrating operations for automated valet parking performed by an infrastructure facility and a vehicle.

In step (1), an automated valet parking preparation process is performed. An infrastructure facility identifies a driver and a vehicle and determines whether the driver and the vehicle are qualified. For example, the infrastructure facility determines whether the driver is a qualified driver by reading an identification number (ID) or a password input by the driver. In addition, the infrastructure facility determines whether the vehicle is a qualified vehicle by reading to an identification number of the vehicle. The vehicle can turn on and off the engine by itself. The vehicle can turn on and off a power supply by itself.

For example, a state in which the engine of the vehicle is turned off and the power supply is turned on is referred to as an accessary-on (ACC-On) state. The engine on/off and the power supply on/off are performed according to commands transmitted from the infrastructure facility or automatically performed without depending on the commands transmitted from the infrastructure. The vehicle can lock and unlock the door by itself. The locking/unlocking of a vehicle door is performed according to commands transmitted from the infrastructure facility or is autonomously performed by the vehicle without depending on the commands from the infrastructure facility. When the vehicle proceeds to an autonomous parking step, it is desired to lock the vehicle door. In addition, the driving authority of the vehicle is delegated to the infrastructure facility. The driving authority means an authority to drive and control the vehicle. The vehicle operations include steering, accelerating, braking, gear shifting, ignition turning on and off, and door locking and unlocking. Since the driving authority of the vehicle is delegated to the infrastructure facility, the infrastructure facility can take complete control of the vehicle during the automated valet parking of the vehicle. Accordingly, it is possible to lower the possibility that an unintended operation of the vehicle occurs and to prevent vehicle accidents in the parking lot. However, in some cases, the driving authority may be partially delegated to the infrastructure facility, or the driving authority may be shared by the vehicle and the infrastructure facility.

For example, a braking operation may be performed when an emergency occurs during the autonomous valet parking. Therefore, it is desired for the vehicle to apply a brake without intervention of the infrastructure facility when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle while the vehicle is parked, the person or animal would be in danger. Therefore, it is desired to confirm that the vehicle is empty before the vehicle is autonomously parked. Whether a person or animal is present in the vehicle may be checked with a sensor mounted in the vehicle.

In step (2), a process of determining a target position, a guide route, and a driving route is performed. The determination of the target position, the guide route, and the driving route is performed by the infrastructure facility. The target position, the guide route, and the driving route determined by the infrastructure facility are delivered from the infrastructure facility to the vehicle. The target position and the guide route are adaptively changeable. For example, there may be a case where a nearby parked vehicle leaves a parking slot while the is autonomously driving along the guide route after receiving the target position and the guide route. In this case, the vehicle may detect the nearby vacant parking slot with a built-in sensor (for example, radar sensor, ultrasonic sensor, camera, etc.). In this case, the vehicle may park in the newly detected nearby vacant parking slot rather than continuing to drive to and park in the target position. In this case, the vehicle may report to the infrastructure facility that it has detected a vacant parking slot and the infrastructure may replace the target position with the vacant parking slot. The vehicle performs autonomous valet parking to the vacant parking slots and ends the autonomous valet parking procedures.

In step (3), an autonomous driving operation is performed in the parking lot. The autonomous driving of the vehicle includes traveling, stopping, and resuming travel. The vehicle performs autonomous driving according to commands transmitted from the infrastructure facility to the vehicle.

Alternatively, the autonomous driving of the vehicle may be performed without relying on the commands from the infrastructure facility. The vehicle can autonomously travel to the target position along the guide route within the permitted driving area. During the autonomous driving of the driverless vehicle, the vehicle is controlled to travel at a preset speed or below. This preset speed may be a value transmitted from the infrastructure facility to the vehicle or may be a value stored in the vehicle. In addition, the vehicle is controlled not to deviate from an error margin of the given guide route when traveling along the guide route. This preset error margin may be a value transmitted from the infrastructure facility to the vehicle or may be a value stored in the vehicle. In addition, the vehicle may turn with a predetermined minimum turning radius when it is desired to turn during the autonomous driving along the guide route. This preset minimum turning radius may be a value transmitted from the infrastructure facility to the vehicle or may be a value stored in the vehicle. The vehicle is controlled not to exceed a predetermined maximum acceleration value when autonomously driving along the guide route. This preset maximum acceleration value may be a value transmitted from the infrastructure facility to the vehicle or may be a value stored in the vehicle.

In step (4), a position measurement process is performed. The target of the position measurement may be a vehicle to be parked in a parking lot, an obstacle existing in the parking lot, or a vehicle that is parked in the parking lot.

The infrastructure facility measures the position of the vehicle or the obstacle and store the measured position in a database. The infrastructure facility identifies and detects vehicles or obstacles and monitors the safety of each of the plurality of vehicles in the parking lot. In addition, the infrastructure facility monitors the operation of the vehicle that is performing autonomous parking after reaching the target position and transmits a command according to the monitoring result. The vehicle measures its position. The vehicle transmits the measured position to the infrastructure facility.

The error of the position measured by the vehicle needs to be within a predetermined error range. The predetermined error range is determined by the infrastructure facility. The vehicle detects obstacles present around the vehicle, measures the positions of the obstacles, and transmits the measured positions of the obstacles to the infrastructure facility. The frequency of communication between the vehicle and the infrastructure facility is a predetermined frequency.

In step (5), an autonomous parking operation is performed by the vehicle. The autonomous parking refers to an operation in which the vehicle that has reached around the target position enters a target vacant parking slot. The vehicle performs autonomous parking by sensing nearby obstacles or vehicles that are parked by using a distance sensor mounted on the vehicle. Examples of the distance sensor mounted on the vehicle include an ultrasonic sensor, a radar sensor, a lidar sensor, and a camera.

In step (6), an emergency braking process is performed. The emergency braking of the vehicle is performed according to a command transmitted from the infrastructure facility or may be performed by itself when the vehicle detects an obstacle regardless of the command transmitted from the infrastructure facility. The infrastructure facility instructs the vehicle to apply an emergency brake when it is determined that an area around the vehicle is unsafe. The case where an area around the vehicle is unsafe may be when there is a risk that the vehicle collides with a nearby vehicle or when the vehicle collides with a sudden obstacle. The obstacle may be a human, an animal, or any object that may be injured or damaged when hit by the vehicle. When there is an object (for example, a low-height object and a soft object) that is not likely to be injured or damaged when hit by the vehicle, an emergency brake is not applied to secure the safety of the vehicle. To this end, the infrastructure facility monitors the situation in the parking lot using sensors (for example, cameras, ultrasonic sensors, radar sensors, etc.) installed in the parking lot. In addition, the infrastructure facility receives position information periodically or aperiodically from a plurality of vehicles existing in the parking lot. The plurality of vehicles existing in the parking lot includes vehicles that are autonomously traveling in the parking lot, vehicles that are performing autonomous parking in the parking lot, and vehicles that are parked in the parking lot. The cases where the vehicle is likely to collide with a nearby vehicle include a case where the vehicle and the nearby vehicle are within a predetermined distance. The cases where the vehicle is likely to collide with a sudden obstacle include a case where the vehicle and the object are within a predetermined distance.

In some cases, when the guide route of the vehicle and the guide route of another vehicle cross, the infrastructure facility monitors the vehicle and its surroundings when the vehicle approaches the cross point to be in a certain distance or less from the cross point. In this case, it is possible to save computing resources in comparison with a case where the monitoring the vehicle is continuously performed. In some cases, when an obstacle appears on the guide route of the vehicle, the infrastructure facility monitors the vehicle and its surroundings when the vehicle approaches the cross point to be in a certain distance or less from the obstacle. Sudden obstacles are highly likely to be immediately removed.

In one form, an emergency brake command may be issued when the vehicle becomes closer to the sudden obstacle in a predetermined distance or less rather than issuing the emergency brake command immediately after the sudden obstacle appears on the guide route. This saves resources used to process information. When the infrastructure facility determines that the surroundings of the vehicle become safe after the emergency braking is performed, the infrastructure facility orders the vehicle to resume autonomous driving or autonomous parking. When the vehicle detects an obstacle, the vehicle may apply an emergency brake. The collision risk means a risk that the vehicle may collide with a certain vehicle or a risk that the vehicle may collide with a sudden obstacle. The term "certain vehicle" may be any vehicle existing in the parking lot. For example, it may be a vehicle that is autonomously traveling in the parking lot, a vehicle that is performing autonomous parking, or a vehicle that is parked in the parking lot. The cases where the vehicle is likely to collide with a certain vehicle include a case where the two vehicles become closer to be within a predetermined distance or less. The sudden obstacle may be a human, an animal, or any object that may be injured or damaged when hit by the vehicle.

When there is an object (for example, a low-height object and a soft object) that is not likely to be injured or damaged when hit by the vehicle, it is desired not to apply an emergency brake in terms of securing the safety of the vehicle. The cases where the vehicle is likely to collide with a sudden obstacle includes a case where the vehicle and the object become closer to be within a predetermined distance or less. In addition, the vehicle reports to the infrastructure facility the emergency braking that is performed by itself or the type or location of an obstacle which is the cause of the emergency braking. The vehicle reduces its speed according to a predetermined deceleration value preset for the emergency braking. This predetermined deceleration value is a value determined by the infrastructure facility or a value stored in the vehicle. The predetermined deceleration value may be determined according to the type of obstacle, the position of the obstacle, and the distance between the vehicle and the obstacle. The vehicle resumes autonomous driving or autonomous parking upon receiving a resumption command for the autonomous driving or autonomous parking from the infrastructure facility.

Alternatively, the vehicle may resume autonomous driving or autonomous parking when it confirms that the obstacle is removed. The vehicle reports to the infrastructure facility the resumption of autonomous driving or autonomous parking and the removal of nearby obstacles.

In step (7), the automated valet parking procedure is finished. After the vehicle has completed autonomous driving and autonomous parking, the infrastructure facility issues a control release command to the vehicle. The vehicle can perform turning on and off an engine and turning on and off a power supply according to a command received from the infrastructure facility or without depending on the command from the infrastructure facility. In addition, the vehicle can lock the vehicle door according to a command received from the infrastructure or without depending on the command from the infrastructure.

Further, the vehicle can apply a parking brake according to a command received from the infrastructure facility or without depending on the command from the infrastructure facility.

In step (8), an error control process is performed.

The error control is performed when an error occurs in communication between the vehicle and the infrastructure facility and/or when a mechanical error of the vehicle occurs.

The infrastructure facility monitors communication with the vehicle to detect whether a communication error occurs.

The vehicle detects a communication error by monitoring the communication with the infrastructure facility.

The vehicle detects whether a mechanical error occurs by monitoring operating states of built-in accessories including a sensor mounted thereon. The vehicle detects the presence of a person or animal in the vehicle and applies an emergency brake when the presence of a person or animal is detected. The vehicle resumes autonomous parking or autonomous driving according to a command received from the infrastructure when the vehicle is in an emergency stop state. Alternatively, the vehicle may determine, by itself, whether the cause of the emergency braking is removed and resumes autonomous parking or autonomous driving when the cause of the emergency braking is removed.

FIG. 5 is a diagram illustrating a communication process performed between the infrastructure for automated valet parking and a vehicle according to one form of the present disclosure.

In step (1), vehicle qualification information is delivered from the vehicle to the infrastructure facility. The vehicle qualification information includes an identifier that distinguishes each vehicle from other vehicles. For example, the vehicle qualification information may be a unique number (for example, license plate number) of the vehicle. The vehicle qualification information is transmitted when an automated valet parking preparation process is performed after the vehicle enters a parking lot (see bracketed reference numeral (1) of FIG. 4A).

In step (2), an autonomous valet parking preparation command is transmitted from the infrastructure facility to the vehicle. The autonomous valet parking preparation command is transmitted before the autonomous driving of the vehicle begins.

In step (3), vehicle information is transmitted from the vehicle to the infrastructure facility. The vehicle information includes state information of the vehicle and position information of the vehicle. The state information of the vehicle includes whether the vehicle is traveling, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure facility.

For example, when the vehicle information does not reach the infrastructure at a predetermined time that is estimated according to the communication frequency, the infrastructure facility determines that an error has occurred in communication between the vehicle and the infrastructure facility.

In step (4) an acknowledgement of the reception of the vehicle information is transmitted from the infrastructure facility to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure facility. For example, when the vehicle information does not reach the infrastructure at a predetermined time that is estimated according to the communication frequency, the infrastructure determines that an error has occurred in communication between the vehicle and the infrastructure.

In step (5), a target position and a guide route are delivered from the infrastructure facility to the vehicle. The delivery of the target position and the guide route may be performed either before or after an autonomous valet parking start command is transmitted from the infrastructure facility to the vehicle.

In step (6), driving-area boundary information is transmitted to the vehicle from the infrastructure facility. The driving-area boundary information includes landmarks (e.g., lines demarcating parking slots, a central line, and road boundary lines demarcating a driving lane) that mark the boundaries of a permitted driving area. The transmission of the driving-area boundary information may be performed after the autonomous valet parking preparation command is delivered. This driving-area boundary information is transmitted from the infrastructure facility to the vehicle in the form of a parking lot map.

In step (7), the autonomous valet parking start command is transmitted from the infrastructure facility to the vehicle. The transmission of the autonomous valet parking start command is performed after the guide route and the driving-area boundary information are delivered. The autonomous valet parking start command is also transmitted when the cause of the emergency braking is removed.

In step (8), an emergency brake command is transmitted to the vehicle from the infrastructure facility.

In step (9), a vehicle control release command is transmitted to the vehicle from the infrastructure facility. The delivery of the vehicle control release command is performed after the vehicle is autonomously parked in a parking slot.

Figure 6:
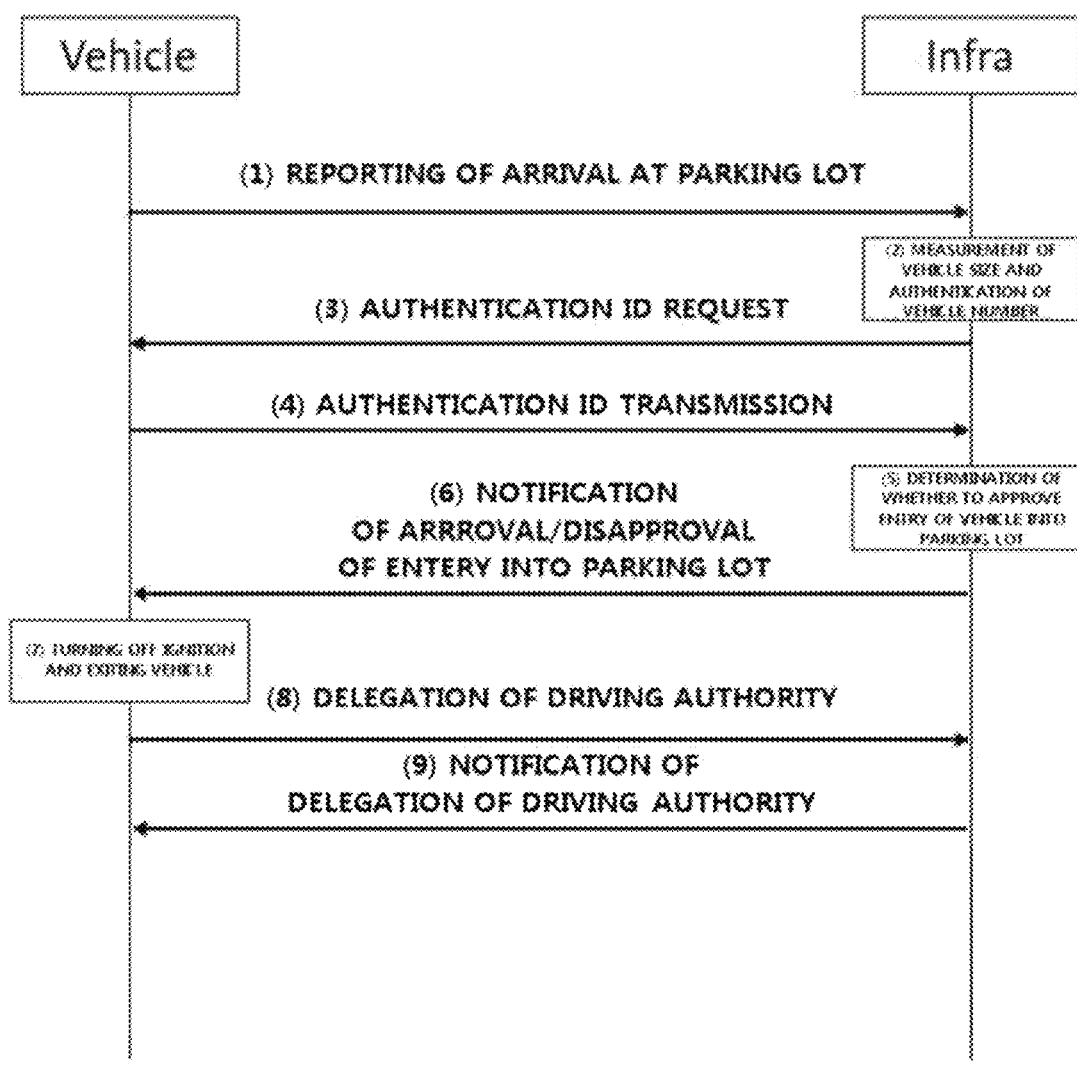
FIG. 6 is a diagram illustrating a communication process performed by a vehicle and an infrastructure facility for automated valet parking.

FIG. 6 is a diagram illustrating a communication process performed between an infrastructure facility 100 for automated valet parking and a vehicle 200.

In step (1), the vehicle 200 enters a parking lot and stops at a predetermined stop position. This stop position may be an entrance gate of the parking lot. The vehicle 200 reports its arrival to the infrastructure facility 100. In step (2), the infrastructure facility 100 measures the dimensions of the vehicle 200 and authenticates the vehicle 200 based on an authentication ID of the vehicle 200. In step (3), the infrastructure facility 100 transmits an authentication ID submission request to the vehicle 200. In step (4), the vehicle 200 transmits the authentication ID to the infrastructure facility 100. In step (5), the infrastructure facility 100 determines whether to allow entry of the vehicle 200 into the parking lot based on the received authentication ID. In step (6), the infrastructure 100 notifies the vehicle whether the vehicle 200 is permitted to enter the parking lot according to the results of the authentication. For example, the infrastructure facility 100 may display a message indicating approval or disapproval on a display panel installed around the stop position. The driver drives the vehicle 200 to a drop-off area when the entry of the vehicle into the parking lot is approved. In step (7), the driver turns off the ignition of the vehicle 200, gets out of the vehicle 200, locks the door of the vehicle 200, and leaves the drop-off area. In step (8), the authority to drive the vehicle 200 is delegated from the vehicle 200 (or the driver) to the infrastructure facility 100. In addition, in step (9), the infrastructure facility 100 notifies the driver that it takes the right to control the vehicle 200 in the parking lot. Such a notification may be sent to a driver's smart device through a mobile communication network.

Figure 7:
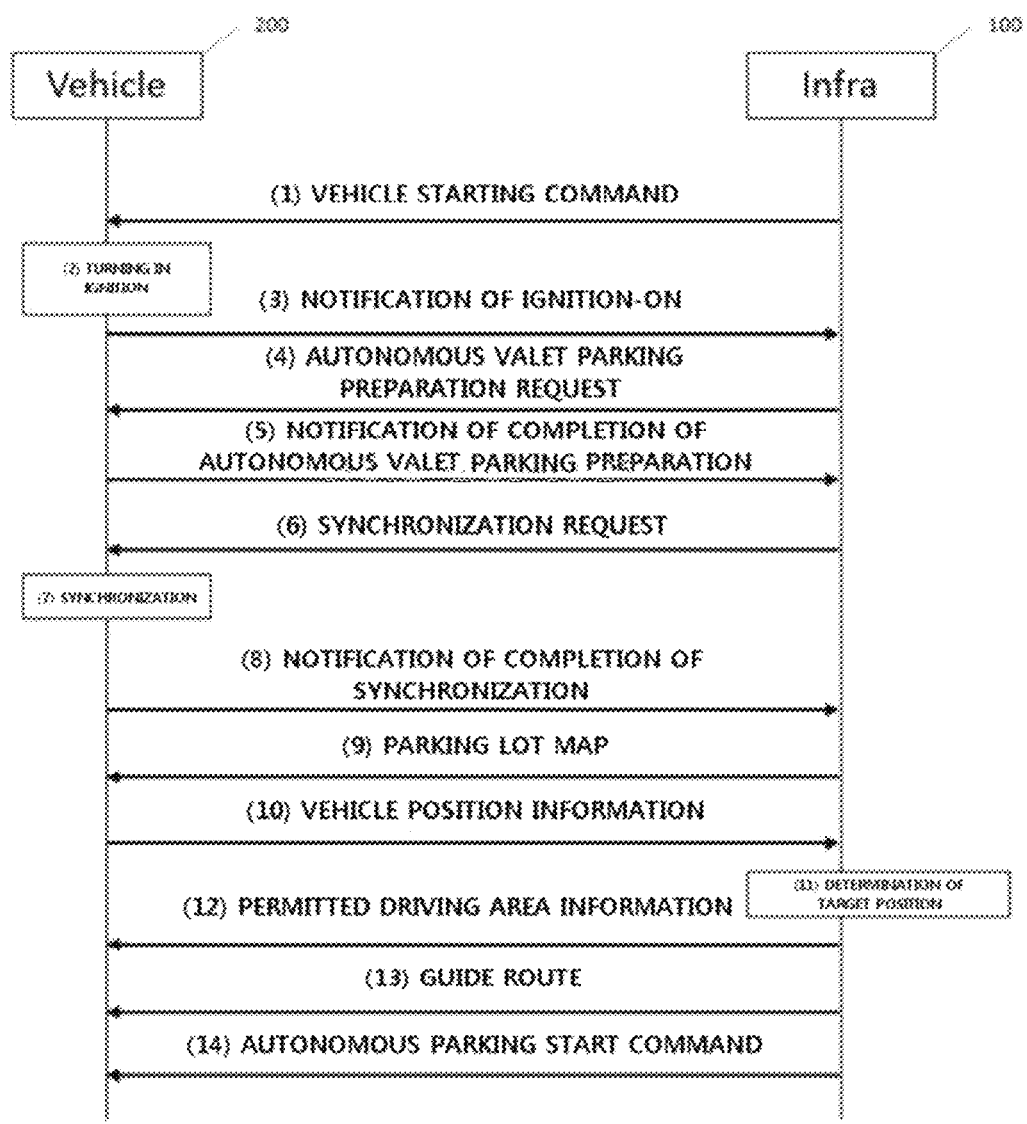
FIG. 7 is a diagram illustrating a communication process performed by a vehicle and an infrastructure facility for automated valet parking.

FIG. 7 is a diagram illustrating a communication process performed between an infrastructure facility 100 for automated valet parking and a vehicle 200.

In step (1), the infrastructure facility 100 transmits a vehicle starting request to the vehicle 200. In step (2), the vehicle 200 turns on the ignition according to the vehicle starting request transmitted from the infrastructure facility 100. In step (3), the vehicle 200 notifies the infrastructure facility 100 that the ignition is turned on according to the vehicle starting request after turning on the ignition. In step (4), the infrastructure facility 100 transmits an automated valet parking preparation request to the vehicle 200. In step (5), the vehicle 200 transmits a reply to the automated valet parking preparation request to the infrastructure facility 100.

The reply is a message of OK indicating that the preparation for automated valet parking is completed or a message of NG indicating that the preparation for automated valet parking is not completed. In step (6), the infrastructure facility 100 transmits a synchronization request to vehicle 200. The synchronization request is a request for instructing synchronization of the time such that the timer of the infrastructure facility 100 is synchronized with the timer of the vehicle 200. For example, the synchronization request includes information about time indicated by the timer of the infrastructure facility 100. In step (7), the vehicle 200 performs the synchronization according to the synchronization request. In step (8), the vehicle 200 transmits a reply indicating that the synchronization is completed to the infrastructure facility 100. For example, until the synchronization between the infrastructure facility 100 and the vehicle 200 is completed, a plurality of synchronization requests may be transmitted from the infrastructure facility 100 to the vehicle 200. In step (9), the infrastructure facility 100 transmits parking lot map information to the vehicle 200. The parking lot map information includes landmark information. In step (10), the vehicle 200 estimates (or calculates) the position of the vehicle 200 based on the transmitted landmark information, and the vehicle 200 transmits the estimated position of the vehicle 200 to the infrastructure facility 100.

In step (11), the infrastructure facility 100 determines a target position (target parking position). In step (12), the infrastructure facility 100 transmits information on a permitted driving area to the vehicle 200. For example, the infrastructure facility 100 transmits boundary information of the permitted driving area to the vehicle 200. In step (13), the infrastructure facility 100 transmits a guide route to the vehicle 200. In step (14), the infrastructure facility 100 transmits an automated valet parking start command to the vehicle 200.

Figure 8:
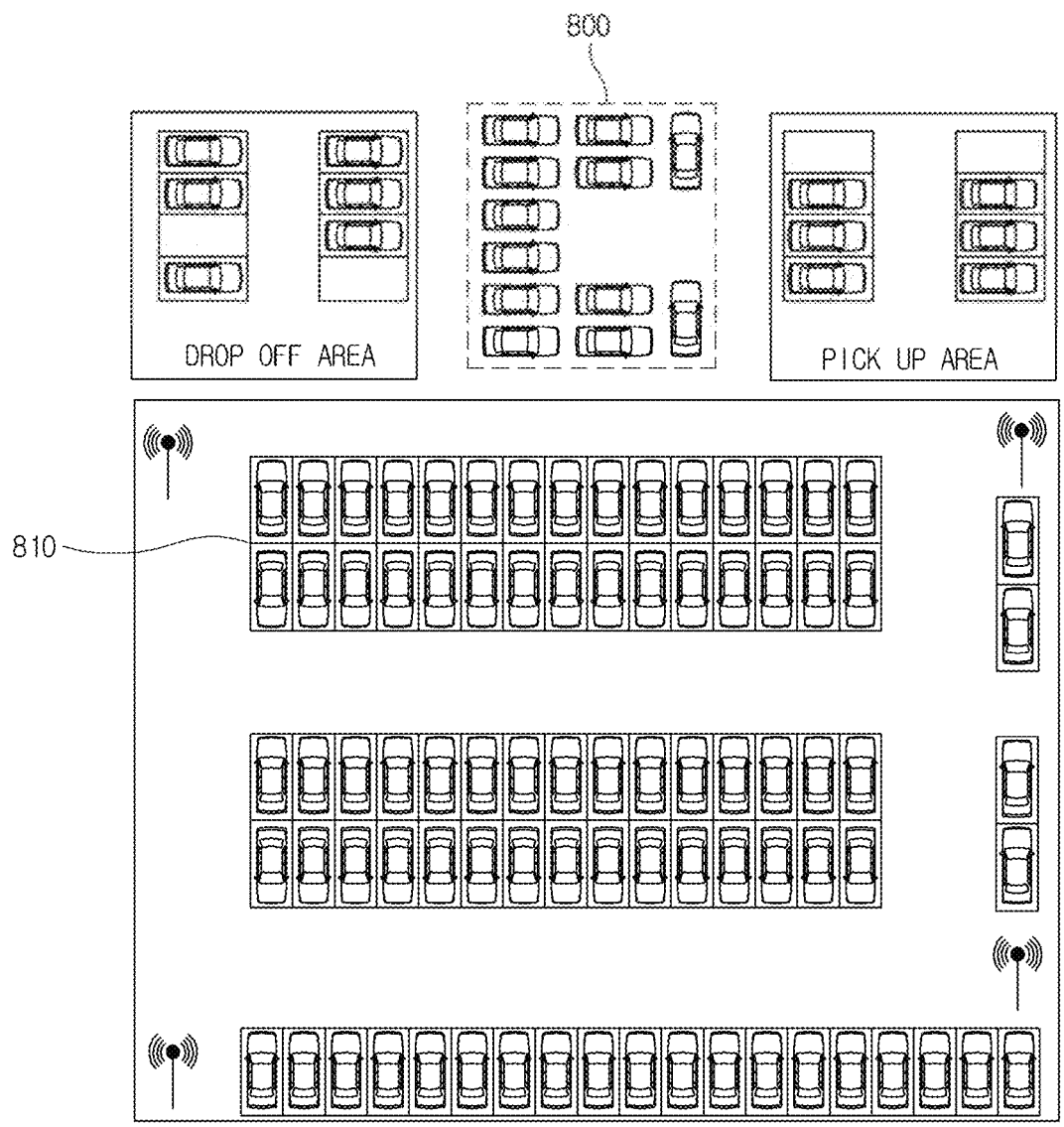
FIG. 8 is a view illustrating a parking lot in which automated valet parking is performed.

FIG. 8 is a view illustrating a parking lot in which automated valet parking is performed, according to one form of the present disclosure.

Referring to FIG. 8, a temporary parking zone 800 is illustrated. The temporary parking zone 800 will be described below in detail.

The temporary parking zone 800 is a predetermined region within the parking lot. The temporary parking zone 800 may be a separate area spaced from a normal parking zone 810 or may be an area provided inside the normal parking zone 810. In the temporary parking zone 800, parking lines demarcating parking slots are not drawn. Alternatively, the temporary parking zone 800 may have parking slots demarcated by parking lines. In a case where parking lines are not drawn, vehicles may be controlled such that as many vehicles as possible can be parked in the temporary parking zone 800 by allowing parallel parking, double parking, and multiple parking.

The temporary parking zone 800 will be used in the cases described below.

When there is no vacant parking slot in the normal parking zone 810, the vehicle will park in the temporary parking zone 800. In this case, the infrastructure facility determines the temporary parking zone 800 as the target position. The vehicle that is assigned the temporary parking zone 800 as the target position by the infrastructure facility autonomously travels to the temporary parking zone 800 and autonomously parks therein.

When a vehicle-related problem occurs in a vehicle that is assigned a vacant parking slot in the normal parking zone 810, the vehicle will park in the temporary parking zone 800 instead of the assigned parking slot. For example, the vehicle-related problems include communication failures, vehicle control failures (steering, braking, accelerating, etc.), and the presence of a passenger inside a vehicle. In this case, the infrastructure facility changes the target position from a specific parking slot in the normal parking zone 810 to the temporary parking zone 800. For example, when a vehicle performing autonomous driving to a vacant parking slot in the normal parking zone 810 detects an abnormality of its own, the vehicle reports the detection of the abnormality to the infrastructure facility. In this case, the infrastructure facility instructs the vehicle to move to the temporary parking zone 800 as the target position.

When a vehicle that is assigned a vacant parking slot in the normal parking zone 810 and which is performing autonomous driving encounters a guide route-related problem, the vehicle moves to and parks in the temporary parking zone 800.

For example, the guide route-related problems include a case where a certain vehicle or a sudden obstacle is present on the guide route. In this case, the infrastructure facility changes the target position from a specific parking slot in the normal parking zone 810 to the temporary parking zone 800. For example, when a vehicle performing autonomous driving to a vacant parking slot in the normal parking zone 810 detects a sudden obstacle present on the guide route, the vehicle reports the detection of the sudden obstacle to the infrastructure facility. In this case, the infrastructure facility instructs the vehicle to move to the temporary parking zone 800 instead of the previously determined target position.

When a vehicle that is assigned a vacant parking slot in the normal parking zone 810 and which is performing autonomous driving to the vacant parking slot encounters a target position-related problem, the vehicle parks in the temporary parking zone 800. For example, the target position-associated problems include a case there is a possibility that the vehicle collides with a certain vehicle (nearby parked vehicle) while the vehicle performs autonomous driving to the target position, a case where a certain vehicle is parked in the target position, and a case where there is an obstacle in the target position. In this case, the infrastructure facility changes the target position from a specific parking slot in the normal parking zone 810 to the temporary parking zone 800. For example, when a vehicle performing autonomous driving to a vacant parking slot in the normal parking zone 810 detects a certain vehicle parked in the target position, the vehicle reports the presence of the parked vehicle in the target position to the infrastructure facility. In this case, the infrastructure facility instructs the vehicle to move to the temporary parking zone 800 instead of the previously determined target position.

When a vehicle parked in the temporary parking zone 800 receives a new target position from the infrastructure facility, the vehicle performs autonomous driving to the new target position. For example, when a parked vehicle leaves and thus a vacant parking slot is made available, the infrastructure may designate this vacant parking slot as a new target position and transmit this new target position to the vehicle parked in the temporary parking zone 800. In this case, the vehicle that has received the new target position performs autonomous driving to the new target position.

In some cases, a vehicle parked in the temporary parking zone 800 may wait for the new target position while being in an idling state without turning off the engine. In some cases, a vehicle parked in the temporary parking zone 800 may wait for the new target position while being in an accessary-on state without completely turning off the vehicle. Since the vehicle is not completely turned off, the vehicle can quickly move to the new target position when the target position is newly allocated.

Figure 9:
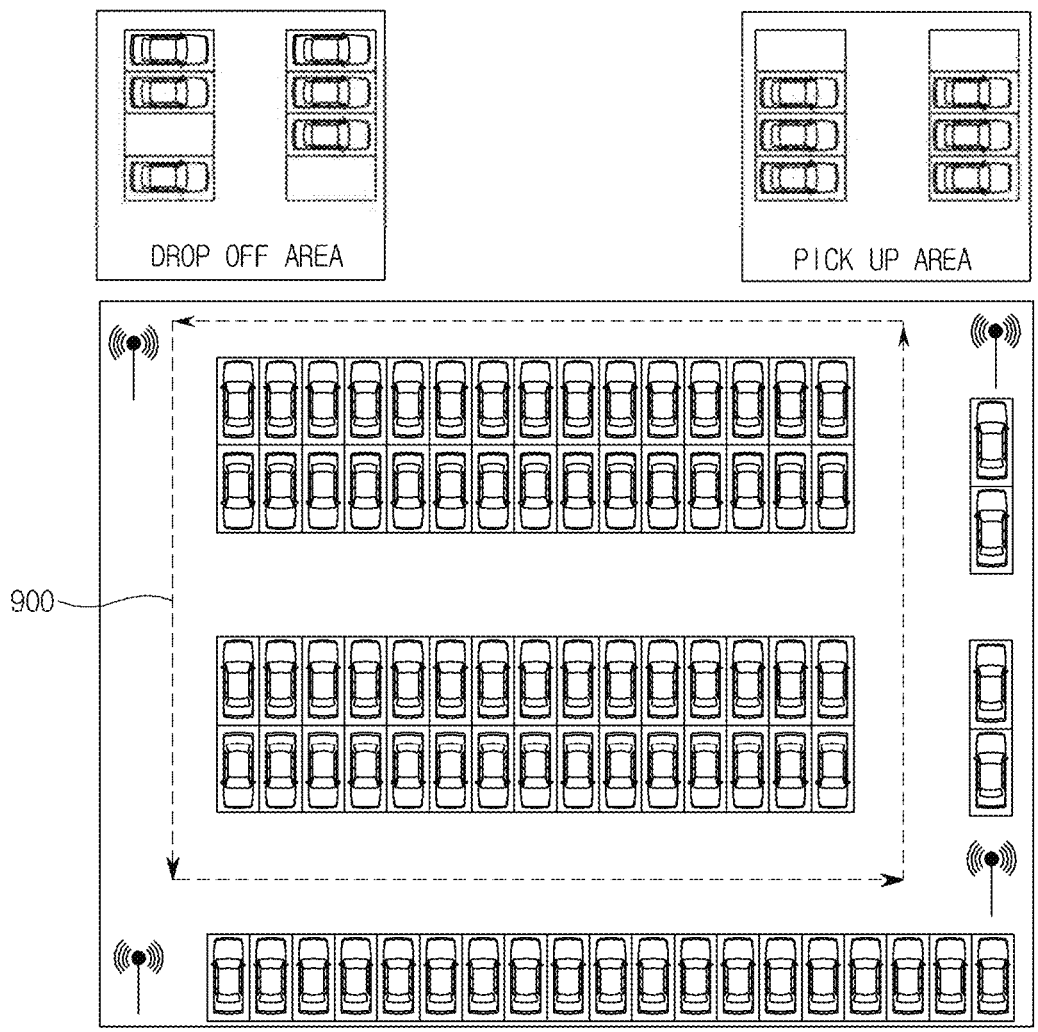
FIG. 9 is a view illustrating a searching drive operation.

FIG. 9 is a view illustrating a searching drive operation according to one form of the present disclosure.

Figure 10:
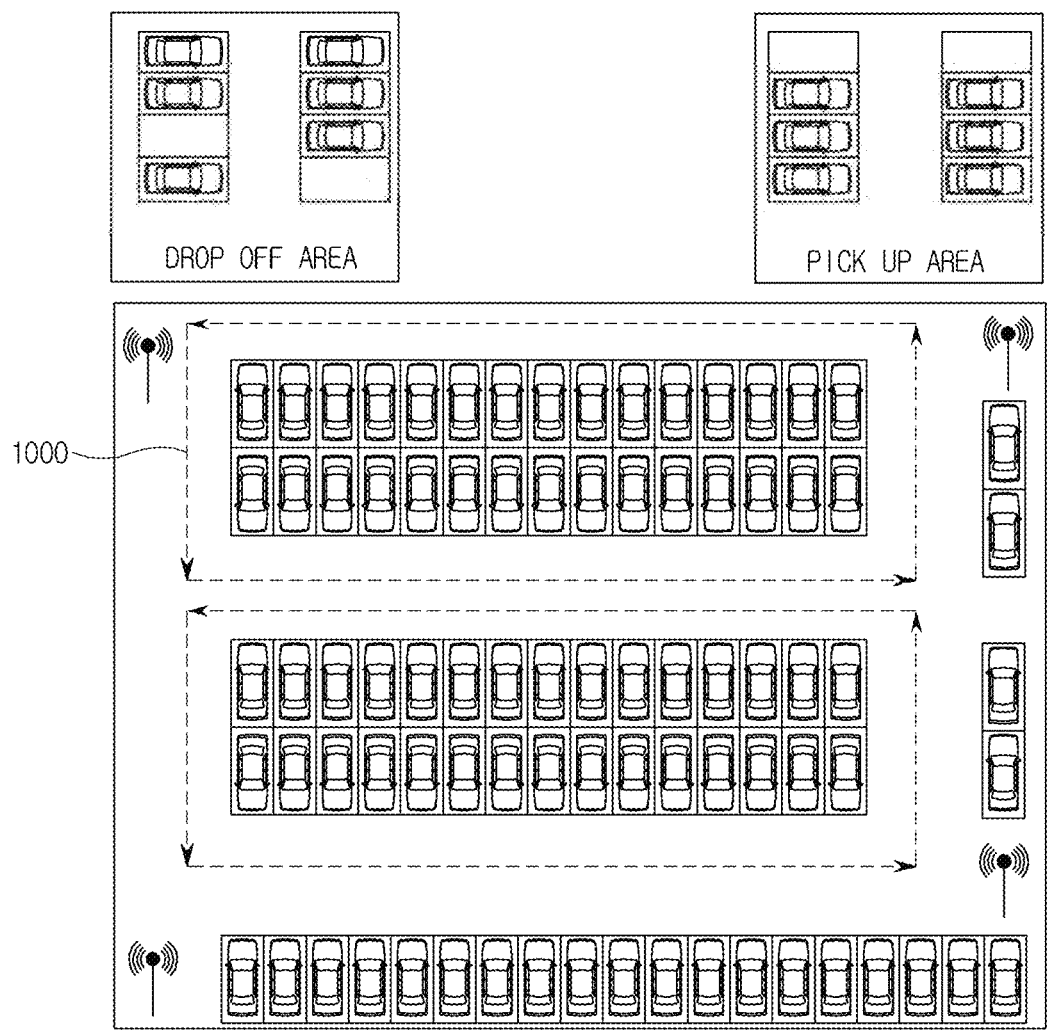
FIG. 10 is a view illustrating a searching drive operation.

FIG. 10 is a view illustrating a searching drive operation according to one form of the present disclosure.

Figure 11:
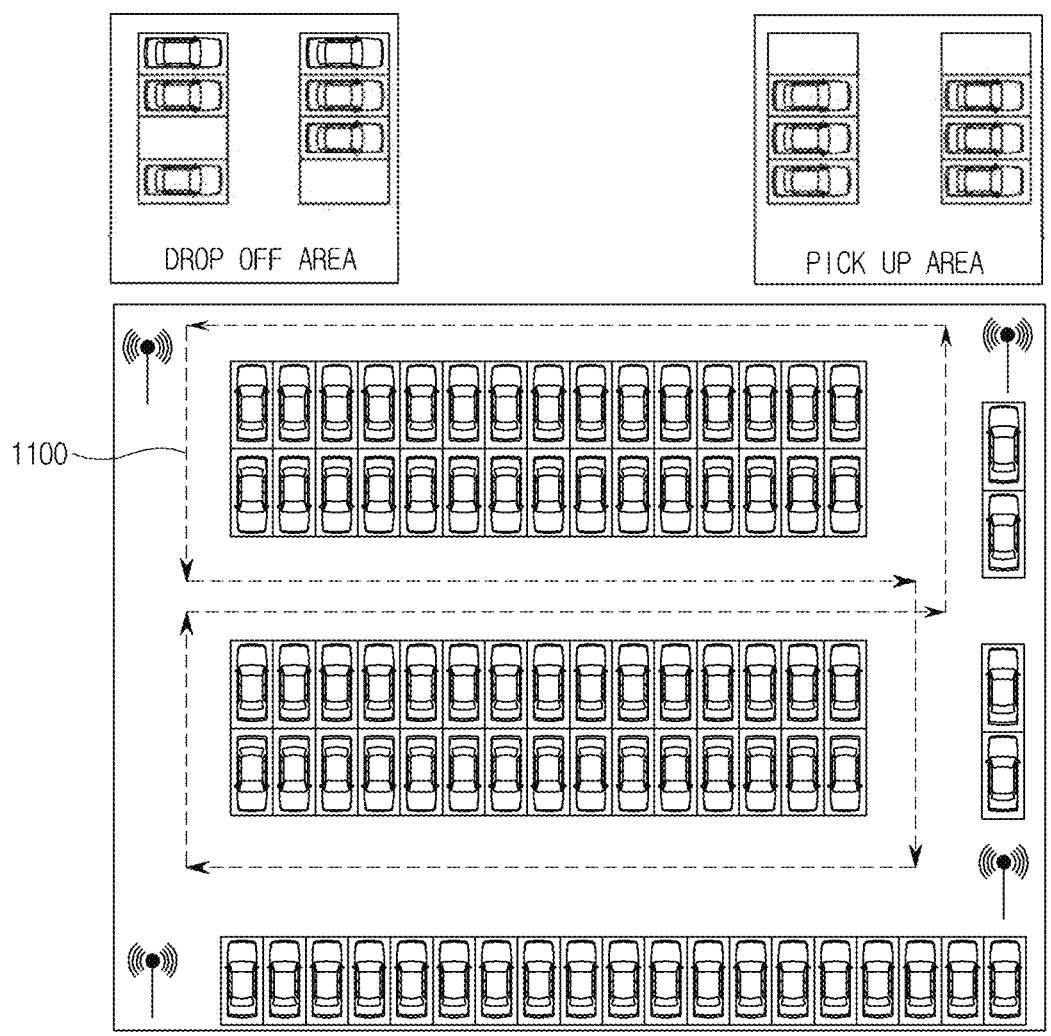
FIG. 11 is a view illustrating a searching drive operation.

FIG. 11 is a view illustrating a searching drive operation according to one form of the present disclosure.

Herein after, the searching drive operation used in the present disclosure will be described in detail with reference to FIGS. 9 to 11.

The searching drive operation means an operation in which a vehicle autonomously travels along a closed loop driving lane in a parking lot when there is no vacant parking slot in the parking lot. For example, referring to FIG. 9, a vehicle autonomously travels along a closed loop driving lane 900 in a parking lot. The closed loop driving lane 900 shown in FIG. 9 is a closed loop track that is the widest area in the parking lot.

For example, referring to FIG. 10, a vehicle autonomously travels along a closed loop driving lane 1000 in a parking lot. The closed loop driving lane 1000 shown in FIG. 10 is a closed loop track that is a relatively narrow area in the parking lot. For example, referring to FIG. 11, a vehicle autonomously travels along a closed loop driving lane 1100 in a parking lot. The closed loop driving lane 1100 illustrated in FIG. 11 is a combination of the closed loop driving lane 900 and the closed loop driving lane 1000 which have a shared portion.

When there is no vacant parking slot at the time of initiating the automated valet parking procedure, the infrastructure facility transmits a closed loop driving lane as a guide route to the vehicle and the vehicle performs autonomous driving along the guide route. This autonomous driving is called a searching drive operation.

When there is no vacant parking slot at the time of initiating the automated valet parking procedure, the searching drive operation is performed such that the vehicle performs autonomous driving using a sensor mounted thereon in a state in which the infrastructure facility does not transmit a target position and a guide route to the vehicle.

A a certain vehicle parked in a parking slot in a parking lot leaves the parking slot, thereby leaving a vacant parking slot while a target vehicle is autonomously driving along one of the closed loop driving lanes illustrated in FIGS. 9 to 11, the target vehicle autonomously moves to and parks in the vacant parking slot.

For example, when a vehicle leaves, the infrastructure facility that continuously monitors the entire area of the parking lot recognizes that the vehicle is leaving, and transmits a vacant parking slot as a target position generated to due to the leaving of the vehicle to a target vehicle that is performing the searching drive operation. In this case, the target vehicle that has received the target position performs autonomous driving to the target position and then performs autonomous parking in the target position.

On the other hand, a vehicle that is performing the searching drive operation can recognize occurrence of a vacant parking slot by itself using a sensor mounted thereon For example, when a nearby vehicle leaves while a target vehicle is performing the searching drive operation, the target vehicle detects the occurrence of a vacant parking slot using a sensor including a LiDAR, an ultrasonic sensor, and a camera. In this case, the target vehicle reports the detection of the vacant parking slot to the infrastructure facility before receiving the target position from the infrastructure facility, and autonomously parks in the detected vacant parking slot.

In one or more exemplary forms, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer.

The computer-readable media include, not limitedly, RAMS, ROMs, EEPROMs, optical discs such as CD-ROM, magnetic disks, and any media that can be accessed by computers and which can be used to transfer a computer program in the form of instructions from one place to another. The computer-readable media is appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a blu-ray disc.

Discs generally refer to media from which data is optically read and disks refer to media from which data is magnetically read. Combinations of the above-mentioned media also fall within the definition of the computer-readable medium.

When forms are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content.

Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include one or more exemplary forms. Of course, the above-described forms do not cover all possible combinations of components and/or methods to implement the present disclosure. Thus, those skilled in the art will appreciate that many further combinations and substitutions of components and/or methods in various forms are possible. Accordingly, the above-described forms cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inferencing" generally refers to a process of determining or inferring with a state of a system, environment, and/or user from a set of observations of events and/or data. Inferencing can be used to identify a specific situation or action, or can generate a probability distribution of certain states, for example.

Inferencing is probabilistic. That is, inferencing may mean a calculation of a probability distribution of those states, based on study on data and events. Inferencing may involve techniques used to construct a higher level event from a set of events and/or data. The inferencing refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, but not limitedly, hardware, firmware, any combination of hardware and software, software, or a computer entity associated with software being executed therein. For example, the term "component" may refer to, not limitedly, a process running on a processor, a processor, an object, an executable thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems based on a signal that is transmitted over a network such as Internet) with a local and/or remote process.

What is claimed is:

1. An automated valet parking method comprising:
   initiating an automated valet parking procedure;
   receiving, by a vehicle, a target position in a normal parking zone and a guide route from an infrastructure facility for parking the vehicle;
   performing, by the vehicle, autonomous driving along the guide route;
   parking, by the vehicle, in the target position and ending the automated valet parking procedure; and
   when a problem occurs in at least one of the vehicle, the guide route or the target position during the autonomous driving, receiving, by the vehicle, a temporary parking zone as the target position,
   wherein the temporary parking zone is a predetermined region within a parking lot and is a separate area spaced apart from the normal parking zone.

2. The method according to claim 1, further comprising: determining, by the infrastructure facility, that an area around the vehicle is unsafe;
   transmitting, by the infrastructure facility, an emergency brake command to the vehicle; and
   applying, by the vehicle, the emergency brake during the autonomous driving of the vehicle.

3. The method according to claim 2, wherein when the infrastructure facility detects a risk that the vehicle collides with other vehicle or a sudden obstacle, the infrastructure facility determines that the area around the vehicle is unsafe.

4. The method according to claim 3, wherein the other vehicle is a vehicle that is in a middle of performing autonomous valet parking or a vehicle that is parked, and the sudden obstacle is a human, an animal, or any object that is likely to be injured or damaged when hit by the vehicle.

5. The method according to claim 1, further comprising:
   determining, by the vehicle, that an area around the vehicle is unsafe, and applying an emergency brake before receiving an emergency brake command from the infrastructure facility; and
   determining, by the vehicle, that the area around the vehicle is unsafe when there is a risk that the vehicle collides with other vehicle or an obstacle.

6. The method according to claim 5, wherein the other vehicle is a vehicle that is in a middle of performing autonomous valet parking or a vehicle that is parked, and the obstacle is a human, an animal, or any object that is likely to be injured or damaged when hit by the vehicle.

7. The method according to claim 5, further comprising: notifying the infrastructure facility that the vehicle is in an emergency stop state after applying the emergency brake.

8. The method according to claim 7, further comprising: notifying the infrastructure facility of a type or a position of the obstacle that causes the emergency stop state.

9. The method according to claim 1, wherein receiving the target position and the guide route includes: receiving the temporary parking zone as the target position instead of the normal parking zone when there is no vacant parking slot in the normal parking zone of the parking lot.

10. The method according to claim 1, wherein when there is no vacant parking slot at a time of initiating the automated valet parking procedure, the vehicle is configured to perform a searching drive operation in which the vehicle autonomously drives along a closed loop driving lane in a parking lot.

11. The method according to claim 10, wherein the infrastructure facility is configured to transmit the closed loop driving lane to the vehicle as the guide route.

12. The method according to claim 10, wherein when an arbitrary vehicle leaves the parking lot so that a vacant parking slot is available, the infrastructure facility is configured to:
    transmit information regarding the vacant parking slot as the target position to the vehicle, and
    transmit a drive path from a current vehicle position to the vacant parking slot as the guide route.

13. The method according to claim 10, wherein when an arbitrary vehicle leaves the parking lot so that a vacant parking slot is available during the vehicle is in a middle of the searching drive operation, detecting, by a sensor of the vehicle, the vacant parking slot;
    notifying the infrastructure facility that the vacant parking slot is available; and
    autonomously moving the vehicle and parking in the vacant parking slot.

14. An automated valet parking system comprising:
    an infrastructure facility configured to: transmit an autonomous valet parking start command to a vehicle and then transmit a target position in a normal parking zone and a guide route to the vehicle; and
    wherein the vehicle is configured to:
    perform autonomous driving along the guide route received from the infrastructure facility, perform parking in the target position received from the infrastructure facility, and ending the autonomous driving, wherein, when a problem occurs in at least one of the vehicle, the guide route, or in the target position during the autonomous driving, the infrastructure facility transmits a temporary parking zone as the target position to the vehicle, and wherein the temporary parking zone is a predetermined region within the parking lot and is a separate area spaced apart from the normal parking zone.

15. The automated valet parking system according to claim 14, wherein the infrastructure facility is configured to transmit an emergency brake command to the vehicle when the infrastructure facility determines that an area around the vehicle is unsafe.

16. The automated valet parking system according to claim 15, wherein:

the infrastructure facility is configured to determine that the area around the vehicle is unsafe when there is a risk that the vehicle collides with other vehicle or an obstacle, the other vehicle is a vehicle that is in a middle of performing autonomous valet parking or a vehicle that is parked, and the obstacle is a human, an animal, or any object that is likely to be injured or damaged when hit by the vehicle.

17. The automated valet parking system according to claim 14, wherein when the vehicle self-determines that an area around the vehicle is unsafe, the vehicle is configured to apply an emergency brake before receiving an emergency brake command from the infrastructure facility.

* * * * *